(12) United States Patent
Liu et al.

(10) Patent No.: US 12,511,137 B2
(45) Date of Patent: Dec. 30, 2025

(54) METHOD AND APPARATUS FOR PRESENTING INFORMATION ON LOCK SCREEN INTERFACE, TERMINAL, AND STORAGE MEDIUM

(71) Applicant: Beijing Bytedance Network Technology Co., Ltd., Beijing (CN)

(72) Inventors: Song Liu, Beijing (CN); Xinyang Zhao, Beijing (CN); Chi Fang, Beijing (CN); Zichun Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/032,793

(22) PCT Filed: Oct. 19, 2021

(86) PCT No.: PCT/CN2021/124575
§ 371 (c)(1),
(2) Date: Apr. 19, 2023

(87) PCT Pub. No.: WO2022/083568
PCT Pub. Date: Apr. 28, 2022

(65) Prior Publication Data
US 2023/0385080 A1    Nov. 30, 2023

(30) Foreign Application Priority Data
Oct. 20, 2020   (CN) .......................... 202011127011.8

(51) Int. Cl.
*H04M 1/72463* (2021.01)
*G06F 3/04817* (2022.01)
(Continued)

(52) U.S. Cl.
CPC .......... *G06F 9/451* (2018.02); *G06F 3/04817* (2013.01); *G06F 9/445* (2013.01); *H04M 1/724631* (2022.02)

(58) Field of Classification Search
CPC ................ G06F 9/451; G06F 3/04817; H04M 1/724631
See application file for complete search history.

(56) References Cited

U.S. PATENT DOCUMENTS 7,676,748 B1 *   3/2010   Barrus ..................... G06F 21/62
                                                   715/741
8,581,877 B2 *  11/2013   Yoo ........................ G06F 1/1671
                                                   345/173
(Continued)

FOREIGN PATENT DOCUMENTS

CN          104199731 A         12/2014
CN          104360874 A          2/2015
(Continued)

OTHER PUBLICATIONS

English translation CN 110851031 (Year: 2020).*
(Continued)

*Primary Examiner* — Alvin H Tan
(74) *Attorney, Agent, or Firm* — BakerHostetler

(57) ABSTRACT

Provided are a method and apparatus for presenting information on a lock screen interface, a terminal, and a storage medium. The method includes: displaying an icon of a predetermined application at a predetermined position on the lock screen interface when a terminal is in a locked mode (S101), and displaying a target user interface of the predetermined application in response to a user operation on the icon of the predetermined application (S102). According to the method, the icon of the predetermined application is displayed at the predetermined position on the lock screen interface, and the target user interface of the predetermined (Continued)

application is displayed in response to the user operation on the icon, which enables quick launching of the application when the terminal is in a locked mode and improves user operation efficiency.

18 Claims, 3 Drawing Sheets

(51) Int. Cl.
*G06F 9/445* (2018.01)
*G06F 9/451* (2018.01)

(56) References Cited

U.S. PATENT DOCUMENTS

| | | | | |
|---|---|---|---|---|
| 8,630,623 | B2* | 1/2014 | Park | H04M 1/67 455/418 |
| 8,638,385 | B2* | 1/2014 | Bhogal | H04N 23/62 348/333.02 |
| 9,563,347 | B2* | 2/2017 | Yano | H04M 1/67 |
| 9,727,124 | B2* | 8/2017 | Lee | H04L 67/60 |
| 9,954,989 | B2* | 4/2018 | Zhou | H04M 1/72403 |
| 11,907,604 | B2* | 2/2024 | Fan | G06F 3/0481 |
| 2013/0053105 | A1* | 2/2013 | Lee | H04M 1/673 455/565 |
| 2013/0086522 | A1* | 4/2013 | Shimazu | G06F 3/04817 715/810 |
| 2013/0162571 | A1* | 6/2013 | Tamegai | G06F 3/04817 345/173 |
| 2013/0191910 | A1 | 7/2013 | Dellinger et al. | |
| 2013/0283199 | A1 | 10/2013 | Selig et al. | |

FOREIGN PATENT DOCUMENTS

| | | |
|---|---|---|
| CN | 104571867 A | 4/2015 |
| CN | 105279422 A | 1/2016 |
| CN | 105740669 A | 7/2016 |
| CN | 110851031 A | 2/2020 |
| CN | 111597004 A | 8/2020 |
| CN | 112256171 A | 1/2021 |

OTHER PUBLICATIONS

WIPO English translation CN 104199731 (Year: 2014).*
Amarasinghe et al, "Reading 22: Graphical User Interfaces," Jan. 11, 2019, Available https://web.archive.org/web/20190111033706/https://www.mit.edu/~6.005/fa14/classes/22-graphical-user-interfaces/ (Year: 2019).*
International Patent Application No. PCT/CN2021/124575; Int'l Search Report; dated Jan. 19, 2022; 3 pages.
Written Opinion for International Application No. PCT/CN2021/124575, mailed Jan. 19, 2022, 9 Pages.

* cited by examiner

METHOD AND APPARATUS FOR PRESENTING INFORMATION ON LOCK SCREEN INTERFACE, TERMINAL, AND STORAGE MEDIUM

CROSS REFERENCE TO RELATED APPLICATIONS

The disclosure is the U.S. National Stage of International Application No. PCT/CN2021/124575, titled "METHOD AND APPARATUS FOR PRESENTING INFORMATION ON LOCK SCREEN INTERFACE, TERMINAL, AND STORAGE MEDIUM", filed on Oct. 19, 2021, which claims priority to Chinese Patent Application No. 202011127011.8, field on Oct. 20, 2020, titled "METHOD AND APPARATUS FOR PRESENTING INFORMATION ON LOCK SCREEN INTERFACE, TERMINAL, AND STORAGE MEDIUM", the entire contents of both of which are incorporated herein by reference.

FIELD

The disclosure relates to the field of computer technology, in particular to a method and apparatus for presenting information on a lock screen interface, a terminal, and a storage medium.

BACKGROUND

The lock screen interface of the terminal provided by the relevant technical solution can be used to display notification messages of an application, but the application interface cannot be opened directly via the lock screen interface; instead, the application needs to be launched after the terminal is unlocked to open the application interface. In some urgent or low security required scenarios (such as photographing or daily entertainment), the efficiency of such interaction is relatively low and the user experience is poor.

SUMMARY

The summary is provided to introduce concepts in a brief form, and these concepts will be described in detail in the following specific embodiments. The summary is not intended to identify the key features or essential features of the technical solution that is required to be protected, nor is it intended to limit the scope of the claimed technical solution.

The first aspect of the disclosure provides a method for presenting information on a lock screen interface, comprising:
  displaying an icon of a predetermined application at a predetermined position on the lock screen interface when a terminal is in a locked mode; and
  displaying a target user interface of the predetermined application in response to a user operation on the icon of the predetermined application.

The second aspect of the disclosure provides an apparatus for presenting information on a lock screen interface, comprising:
  a layout unit, configured to display an icon of a predetermined application at a predetermined position on the lock screen interface when a terminal is in a locked mode; and
  a display unit, configured to display a target user interface of the predetermined application in response to a user operation on the icon of the predetermined application.

The third aspect of the disclosure provides a terminal, comprising:
  at least one processor; and
  at least one memory communicatively coupled to the at least one processor and storing instructions that upon execution by the at least one processor cause the terminal to perform the method for presenting information on a lock screen interface provided by the disclosure.

The third aspect of the disclosure provides a non-transitory computer-readable storage medium, storing program instructions that upon execution by a computing device, cause the computing device to perform the method for presenting information on a lock screen interface provided by the disclosure.

The method of presenting information in a lock screen interface according to embodiments of the present disclosure, by displaying an icon of a predetermined application at a predetermined position on the lock screen interface and displaying a target user interface of the predetermined application in response to a user operation on the icon, enables quick launching of the application when the terminal is in a locked mode and improves user operation efficiency.

BRIEF DESCRIPTION OF THE DRAWINGS

The above and other features, advantages, and aspects of various embodiments of the disclosure will become more apparent with reference to the accompanying drawings and specific implementations below. The same or similar reference numerals throughout the drawings denote the same or similar elements. It should be understood that the drawings are schematic and the originals and elements are not necessarily drawn to scale.

DETAILED DESCRIPTION OF THE EMBODIMENTS

Figure 1:
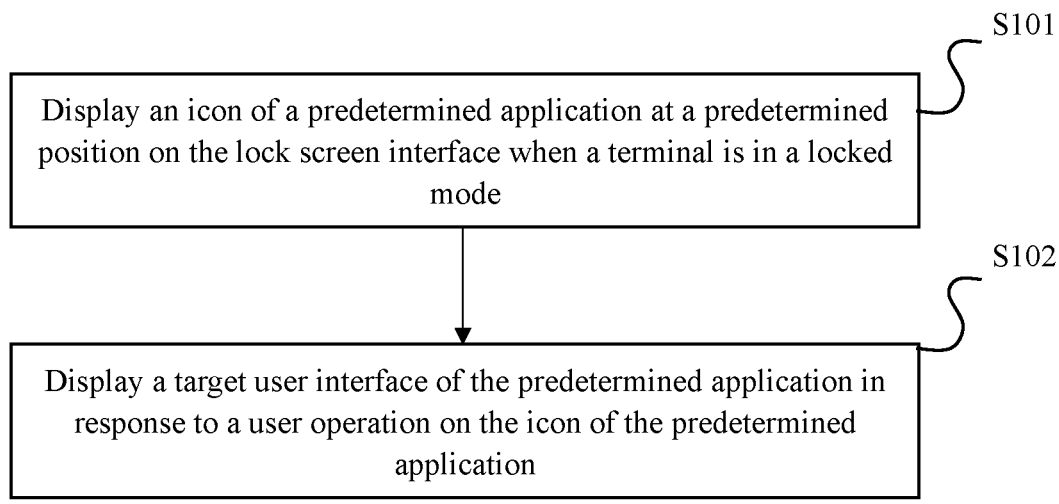
FIG. 1 is a flowchart of a method for presenting information on a lock screen interface provided according to an embodiment of the disclosure.

The embodiments of the disclosure will be described in more detail below with reference to the accompanying drawings. Although some embodiments of the disclosure are shown in the accompanying drawings, it should be understood that the disclosure may be implemented in various forms and should not be construed as being limited to the embodiments described herein, on the contrary, these embodiments are provided for a more thorough and complete understanding of the disclosure. It should be understood that the accompanying drawings and embodiments of the disclosure are merely illustrative, rather than limiting the scope of protection of the disclosure.

It should be understood that the steps described in the embodiments of the disclosure may be performed according to different orders and/or in parallel. In addition, the embodiments may include additional steps and/or omit the execution of the shown steps. The scope of the disclosure is not limited in this aspect.

The term "comprising" used herein and variants thereof means open-ended including, i.e., "including, but not limited to". The term "based on" refers to "based at least in part on". The term "one embodiment" represents "at least one embodiment"; the term "the other embodiment" represents "at least one additional embodiment"; and the term "some embodiments" represents "at least some embodiments". The term "in response to" and related terms mean that one signal or event is influenced to some extent by another signal or event, but not necessarily completely or directly. If an event (e.g., "x") occurs in response to another event (e.g., "y"), x can be directly or indirectly in response toy. For example, the occurrence of y can eventually result in the occurrence of x, but there may be other intermediate events and/or conditions. In other scenarios, y may not necessarily result in the occurrence of x, and x may occur even though y has not occurred. In addition, the term "in response to" can also mean "at least partially in response to". The term "determining" comprises a wide variety of actions, including processing, looking up (e.g., looking up in a database, a table, or another data structure), deriving, computing, calculating, investigating, ascertaining and the like, and may include receiving, accessing (e.g., accessing data in a memory) and the like, as well as parsing, selecting, choosing, establishing and the like. Definitions of other terms will be provided in the description below.

It should be noted that the terms such as "first", "second" and the like mentioned in the disclosure are merely intended to distinguish different devices, modules or units, rather than limiting an order of functions executed by these devices, modules or units or an interdependence among these devices, modules or units.

It should be noted that the modifications of "a" and "multiple" mentioned in the disclosure are illustrative, but are not restrictive. It should be understood by those skilled in the art that it should be understood as "one or more" unless otherwise specified in the context.

For the purposes of the disclosure, the phrase "A and/or B" means (A), (B), or (A and B).

Names of messages or information interacted among a plurality of devices in the embodiments of the disclosure are merely for an illustrative purpose, rather than limiting the scope of these messages or information.

FIG. 1 shows a flowchart of a method 100 for presenting information on a lock screen interface provided by an embodiment of the disclosure, including steps S101 and S102.

Step S101, an icon of a predetermined application is displayed at a predetermined position on the lock screen interface when a terminal is in a locked mode.

The predetermined application may be defaulted by a system, or set according to a user operation or an instruction of a remote server.

Step S102, a target user interface of the predetermined application is displayed in response to a user operation on the icon of the predetermined application.

The user operation on the icon of the predetermined application includes but is not limited to, the user touching the icon, clicking the icon using an external control device, initiating the operation of the predetermined application by voice command, gesture command and the like. The target user interface is one or more interfaces corresponding to the predetermined application. Exemplarily, if the user interfaces of a multimedia social application A include a music interface a1, a video interface a2, a press interface a3 and a chat interface a4, the target user interface may be one or more of the interfaces a1, a2, a3 and a4.

In some embodiments, the target user interface may be preset by the user. In this embodiment, the user interfaces of the predetermined application that can be displayed in the locked mode can be preset by the user, thereby allowing the content presented on the lock screen interface to be customized for security or personalization based on user preferences.

The method of presenting information in a lock screen interface according to embodiments of the present disclosure, by displaying an icon of a predetermined application at a predetermined position on the lock screen interface and displaying a target user interface of the predetermined application in response to a user operation on the icon, enables quick launching of the application when the terminal is in a locked mode and improves user operation efficiency.

In some embodiments, the predetermined application is set to a non-sleep mode when the terminal is in the locked mode. In this embodiment, the predetermined application is set to a non-sleep mode which prevents the predetermined application from sleeping in the locked mode. Exemplarily, the predetermined application may be set to the non-sleep mode by removing a sleep token associated to the predetermined application.

In some embodiments, when the terminal is in the locked mode, a root node of the predetermined application is placed below a root node of the lock screen interface. In this embodiment, the root node of the predetermined application is placed below the root node of the lock screen interface, so that the user interfaces of the predetermined application can be displayed on the lock screen interface, and the predetermined application can be launched in the locked mode. The above-mentioned implementation in which the predetermined application can be launched on the lock screen interface by setting the root node is merely exemplary and does not constitute a limitation to the disclosure.

Figure 2:
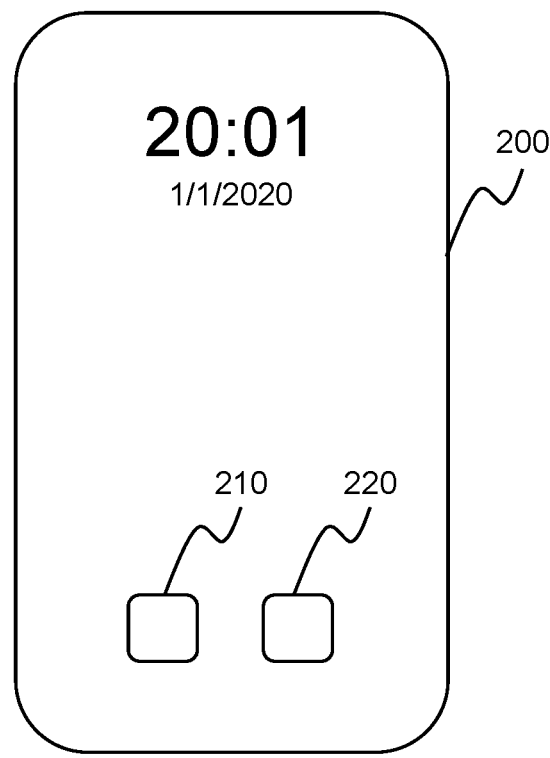
FIG. 2 is a schematic diagram of a lock screen interface provided according to an embodiment of the disclosure.
Figure 3:
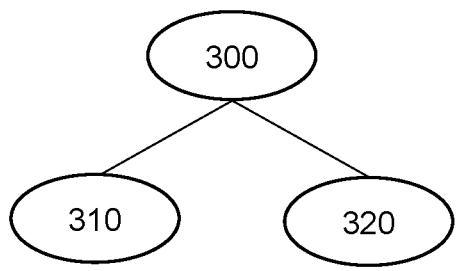
FIG. 3 is a schematic diagram of root nodes in the lock screen interface provided according to another embodiment of the disclosure.

FIG. 2 and FIG. 3 show a schematic diagram of a lock screen interface and a schematic diagram of hierarchical tree structure corresponding to the lock screen interface according to an embodiment of the disclosure, respectively. An icon 210 of a predetermined application A and an icon 220 of a predetermined application B are placed on a lock screen interface 200. Accordingly, a root node 310 of the predetermined application A and a root node 320 of the predetermined application B are placed below a root node 300 of the lock screen interface 200. The lock screen interface 200 is a graphical user interface displayed by a device (such as a computer or smartphone) in a locked mode which prevents access to most functions of the device until a certain action (such as entering a predetermined password) is performed.

In some embodiments, the method further includes: notifying the predetermined application that the terminal is currently in an unlocked mode.

Since some applications are configured to be able to determine whether the terminal is currently in a locked mode and thus prevent the user from using the application in the locked mode, the embodiment prevents the predetermined application from being restricted in the locked mode by notifying the predetermined application that the terminal is currently unlocked.

In some embodiments, the method 100 further includes: removing the icon of the predetermined application from the lock screen interface in response to a predetermined user operation. Thus, in this embodiment, the user is allowed to adjust the predetermined application displayed on the lock screen interface in the locked mode, thereby allowing the content presented on the lock screen interface to be customized for security or personalization based on user preferences.

In some embodiments, the method further includes: setting the predetermined application to a sleep mode in response to the predetermined user operation.

In some embodiments, the method further includes: placing the root node of the predetermined application below a root node of a desktop interface in response to the predetermined user operation.

In some embodiments, step S102 includes: displaying the target user interface of the predetermined application on the lock screen interface based on a predetermined display scale.

In some embodiments, the display scale is less than 1, thereby reducing the display of the target user interface in the locked mode.

In some embodiments, the target user interface includes controls for application exiting, page backward, or window minimization.

Figure 4:
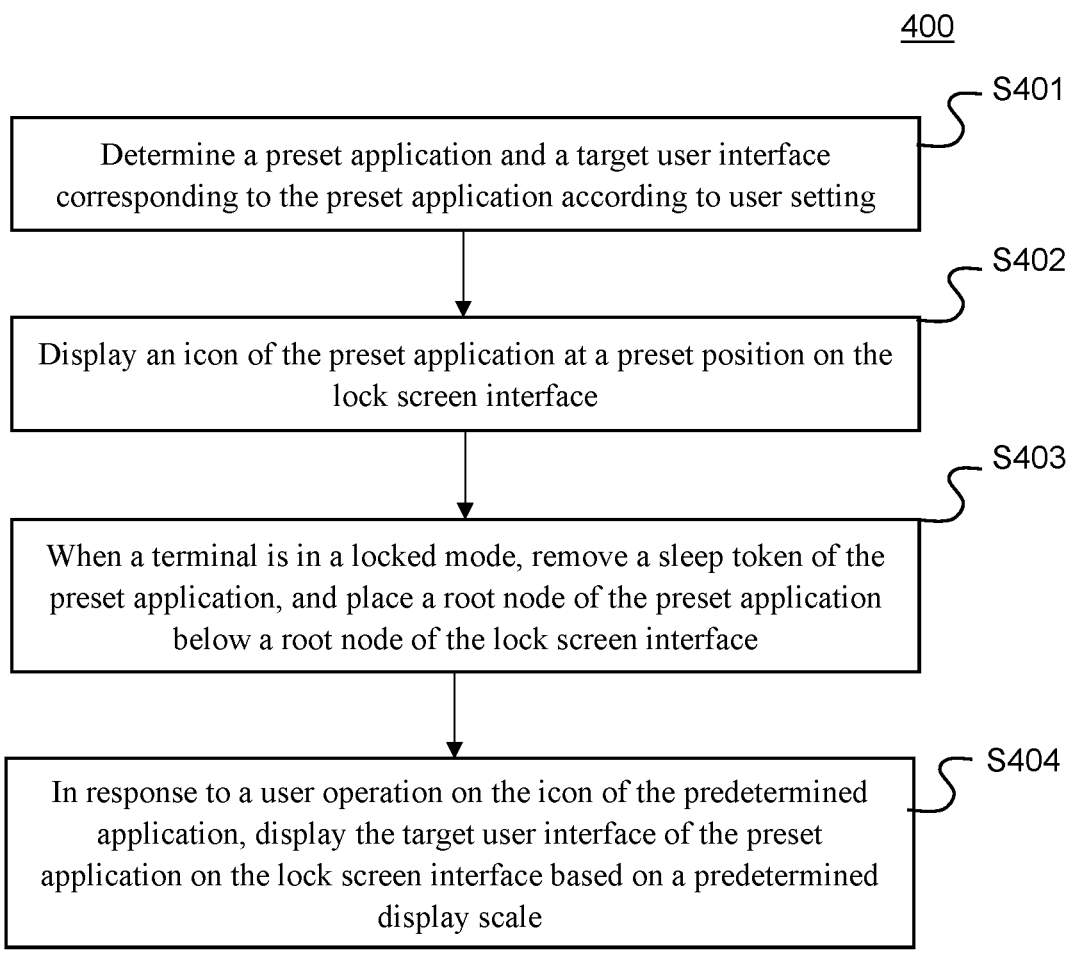
FIG. 4 is a flowchart of a method for presenting information on a lock screen interface according to another embodiment of the disclosure.

Refer to FIG. 4, which shows a flowchart of a method 400 for presenting information on a lock screen interface provided by an embodiment of the disclosure, including steps S401-S404.

Step S401, a predetermined application and a target user interface corresponding to the predetermined application are determined according to user setting;

S402, an icon of the predetermined application is displayed at a predetermined position on the lock screen interface;

Step S403, when a terminal is in a locked mode, a sleep token of the predetermined application is removed, and a root node of the predetermined application is placed below a root node of the lock screen interface;

Step S404, in response to a user operation on the icon of the predetermined application, the target user interface of the predetermined application is displayed on the lock screen interface based on a predetermined display scale.

Figure 5:
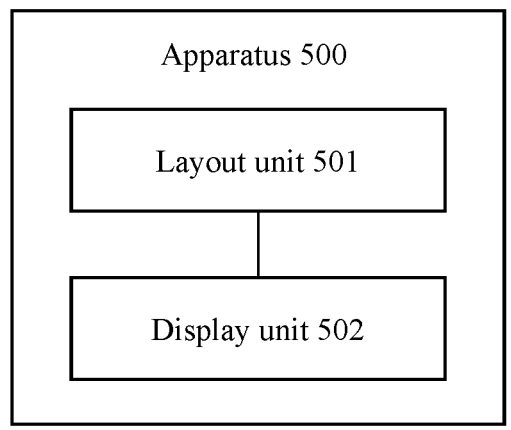
FIG. 5 is a structural schematic diagram of an apparatus for presenting information on a lock screen interface provided according to an embodiment of the disclosure.

Correspondingly, as shown in FIG. 5, an embodiment of the disclosure provides an apparatus 500 for presenting information on a lock screen interface, including:
 a layout unit 501, configured to display an icon of a predetermined application at a predetermined position on the lock screen interface when a terminal is in a locked mode; and
 a display unit 502, configured to display a target user interface of the predetermined application in response to a user operation on the icon of the predetermined application.

Since the apparatus embodiment basically corresponds to the method embodiments, the relevant part can refer to the part of the description of the method embodiments. The apparatus embodiment described above is merely illustrative, and the units described as separate units may or may not be separate. Some or all of the units can be selected according to actual needs to achieve the objects of the solutions of the embodiments. Those of ordinary skill in the art can understand and implement without creative work.

The apparatus of presenting information in a lock screen interface according to embodiments of the present disclosure, by displaying an icon of a predetermined application at a predetermined position on the lock screen interface and displaying a target user interface of the predetermined application in response to a user operation on the icon, enables quick launching of the application when the terminal is in a locked mode and improves user operation efficiency.

In some embodiments, the apparatus further includes:
 sleep mode setting unit, configured to set the predetermined application to a non-sleep mode when the terminal is in the locked mode.

In this embodiment, the predetermined application is set to a non-sleep mode which prevents the predetermined application from sleeping in the locked mode. Exemplarily, the predetermined application may be set to the non-sleep mode by removing a sleep token associated to the predetermined application.

In some embodiments, the apparatus further includes:
 node setting unit, configured to place a root node of the predetermined application below a root node of the lock screen interface when the terminal is in the locked mode.

In this embodiment, the root node of the predetermined application is placed below the root node of the lock screen interface, so that the user interfaces of the predetermined application can be displayed on the lock screen interface, and the predetermined application can be launched in the locked mode. The above-mentioned implementation in which the predetermined application can be launched on the lock screen interface by setting the root node is merely exemplary and does not constitute a limitation to the disclosure.

In some embodiments, the apparatus further includes:
 notification unit, configured to notify the predetermined application that the terminal is currently in an unlocked mode.

Since some applications are configured to be able to determine whether the terminal is currently in a locked mode and thus prevent the user from using the application in the locked mode, the embodiment prevents the predetermined application from being restricted in the locked mode by notifying the predetermined application that the terminal is currently unlocked.

In some embodiments, the apparatus further includes:
 icon removing unit, configured to remove the icon of the predetermined application from the lock screen interface in response to a predetermined user operation. Thus, in this embodiment, the user is allowed to adjust the predetermined application displayed on the lock screen interface in the locked mode, thereby allowing the content presented on the lock screen interface to be customized for security or personalization based on user preferences.

In some embodiments, sleep mode setting unit is further configured to set the predetermined application to a sleep mode in response to the predetermined user operation.

In some embodiments, the node setting unit is further configured to place the root node of the predetermined application below a root node of a desktop interface in response to the predetermined user operation.

In some embodiments, the display unit 502 is further configured to display the target user interface of the predetermined application on the lock screen interface based on a predetermined display scale.

In some embodiments, the display scale is less than 1, thereby reducing the display of the target user interface in the locked mode.

In some embodiments, the target user interface includes controls for application exiting, page backward, or window minimization.

Correspondingly, the disclosure further provides a terminal comprising:

at least one processor; and at least one memory communicatively coupled to the at least one processor and storing instructions that upon execution by the at least one processor cause the terminal to perform the method for presenting information on a lock screen interface provided by one or more embodiments according to the disclosure.

Correspondingly, the disclosure further provides a non-transitory computer storage medium storing program instructions that upon execution by a computing device, cause the computing device to perform the method for presenting information on a lock screen interface provided by one or more embodiments according to the disclosure.

Figure 6:
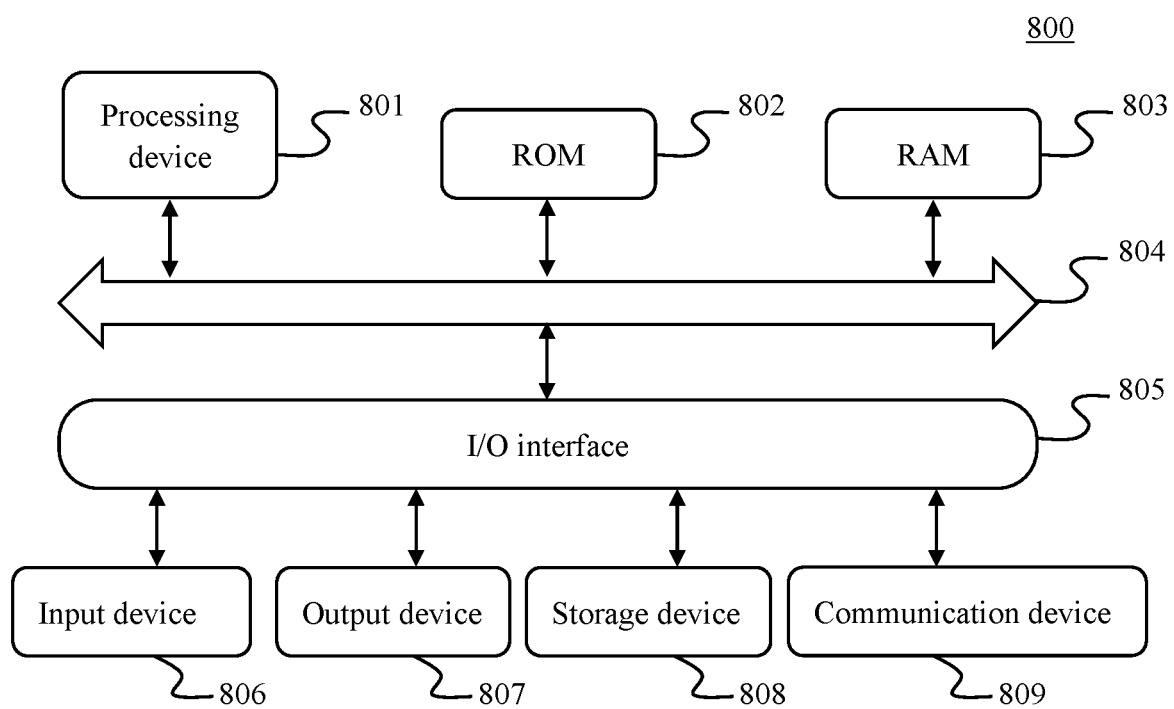
FIG. 6 is a schematic structural diagram of a terminal device for implementing the embodiments of the disclosure.

Referring now to FIG. 6, a structural schematic diagram of terminal equipment 800 suitable for implementing an embodiment of the disclosure is shown. The terminal equipment in the embodiment of the present disclosure can include, but is not limited to, mobile terminals such as a mobile phone, a notebook computer, a digital broadcast receiver, a personal digital assistant (PDA), a Pad, a portable media player (PMP) and a vehicle-mounted terminal (e.g., vehicle-mounted navigation terminal), and fixed terminals such as a digital TV and a desktop computer. The terminal equipment shown in FIG. 6 is only an example, and should not bring any restrictions on the functions and application scope of the embodiments of the present disclosure.

As shown in FIG. 6, the terminal equipment 800 can comprise a processing device (e.g., central processing unit, graphics processor, etc.) 801, which can perform various appropriate actions and processing according to a program stored in a read-only memory (ROM) 802 or a program loaded into a random access memory (RAM) 803 from a storage device 808. In the RAM 803, various programs and data required for the operation of the terminal equipment 800 are also stored. The processing device 801, the ROM 802, and the RAM 803 are connected through a bus 804. An Input/Output (I/O) interface 805 is also connected to the bus 804.

Generally, the following devices can be connected to the I/O interface 805: an input device 806 such as a touch screen, a touch pad, a keyboard, a mouse, a camera, a microphone, an accelerometer, and a gyroscope; an output device 807 such as a liquid crystal display (LCD), a speaker and a vibrator; a storage device 808 such as a magnetic tape and a hard disk; and a communication device 809. The communication device 809 can allow the terminal equipment 800 to perform wireless or wired communication with other equipment to exchange data. Although FIG. 6 shows the terminal equipment 800 with various devices, it should be understood that it is not required to implement or provide all the devices shown. More or fewer devices may alternatively be implemented or provided.

Particularly, according to the embodiments of the disclosure, the processes described above with reference to the flowcharts may be implemented as computer software programs. For example, the embodiments of the disclosure comprise a computer program product comprising a computer program carried by a computer-readable medium, and the computer program contains program codes for executing the method shown in the flowcharts. In such embodiment, the computer program can be downloaded and installed from a network through the communication device 809, or installed from the storage device 808, or installed from the ROM 802. When the computer program is executed by the processing device 801, the above functions defined in the method of the embodiments of the disclosure are executed.

It should be noted that the above-mentioned computer-readable medium can be a computer-readable signal medium or a computer-readable storage medium or any combination of the two. The computer-readable storage medium may be, for example, but not limited to, an electrical, magnetic, optical, electromagnetic, infrared or semiconductor system, device or component, or any combination of the above. More specific examples of the computer-readable storage medium may include, but are not limited to, an electrical connector with one or more wires, a portable computer disk, a hard disk, an RAM, an ROM, an electrically erasable programmable read only memory (EPROM) or flash memory, an optical fiber, a portable compact disc read-only memory (CD-ROM), an optical storage device, a magnetic storage device, or any suitable combination of the above. In the disclosure, the computer-readable storage medium can be any tangible medium containing or storing a program, which can be used by or in combination with an instruction execution system, device, or component. In the disclosure, the computer-readable signal medium can comprise a data signal propagated in a baseband or as part of a carrier wave, in which computer-readable program codes are carried. This propagated data signal can take various forms, including but not limited to an electromagnetic signal, an optical signal, or any suitable combination of the above. The computer-readable signal medium can also be any computer-readable medium other than the computer-readable storage medium, and the computer-readable signal medium can send, propagate, or transmit the program for use by or in connection with the instruction execution system, device, or component. The program codes contained in the computer-readable medium can be transmitted by any suitable medium, including but not limited to electric wire, optical cable, radio frequency (RF) or any suitable combination of the above.

In some embodiments, the client and the server can use any currently known or future developed network protocols such as HTTP (HyperText Transfer Protocol) to communicate, and can communicate with any form or medium digital data communications (e.g., communications networks) interconnected. Examples of communication networks include local area networks ("LAN"), wide area networks ("WAN"), the Internet, and peer-to-peer networks (e.g., ad hoc peer-to-peer networks), as well as any currently known or future developed network.

The computer-readable medium can be included in the terminal equipment, and can also exist alone without being assembled into the terminal equipment.

The computer-readable medium carries one or more programs, and when the one or more programs are executed by the terminal equipment, the terminal equipment is caused to: display an icon of a predetermined application at a predetermined position on the lock screen interface when a terminal is in a locked mode, and display a target user interface of the predetermined application in response to a user operation on the icon of the predetermined application.

Computer program codes for performing the operations of the disclosure can be written in one or more programming languages or a combination thereof, including object-oriented programming languages such as JAVA®, SMALLTALK®, C++, and conventional procedural programming languages such as "C" language or similar programming languages. The program code can be completely or partially executed on a user computer, executed as an independent software package, partially executed on a user computer, and partially executed on a remote computer, or completely executed on a remote computer or server. In a case involving a remote computer, the remote computer can be connected to a user computer through any kind of network including a local area network (LAN) or a wide area network (WAN), or can be connected to an external computer (e.g., connected through the Internet using an Internet service provider).

The flowcharts and block diagrams in the drawings show the architectures, functions, and operations of possible implementations of systems, methods, and computer program products according to various embodiments of the disclosure. In this regard, each block in the flowchart or block diagram can represent a module, a program segment or part of a code that contains one or more executable instructions for implementing a specified logical function. It should also be noted that in some alternative implementations, the functions noted in the blocks can also occur in a different order from those noted in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

The modules or units described in the embodiments of the disclosure can be implemented by software or hardware. The name of a module or unit does not constitute a limitation to the module or unit itself under certain circumstances. For example, the task determination unit can also be described as "a unit for determining whether a view of a first task is currently displayed on a desktop".

The functions described herein above may be performed, at least in part, by one or more hardware logic components. For example, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and etc.

In the context of the present disclosure, a machine-readable medium may be a tangible medium that may contain or store programs for use by or in combination with an instruction execution system, device, or device. The machine-readable medium may be a machine-readable signal medium or a machine-readable storage medium. Machine readable media may include, but are not limited to, electronic, magnetic, optical, electromagnetic, infrared, or semiconductor systems, devices or devices, or any suitable combination of the above. More specific examples of machine-readable storage media will include electrical connections based on one or more lines, portable computer disks, hard disks, random access memory (RAM), read only memory (ROM), erasable programmable read only memory (EPROM or flash memory), optical fibers, portable compact disk read only memory (CD-ROM), optical storage devices, magnetic storage devices or any suitable combination of the above.

In some embodiments, the disclosure provides a method for presenting information on a lock screen interface, comprising: displaying an icon of a predetermined application at a predetermined position on the lock screen interface when a terminal is in a locked mode; and displaying a target user interface of the predetermined application in response to a user operation on the icon of the predetermined application.

In some embodiments, the method further comprises: setting the predetermined application to a non-sleep mode when the terminal is in the locked mode.

In some embodiments, the method further comprises: placing a root node of the predetermined application below a root node of the lock screen interface when the terminal is in the locked mode.

In some embodiments, the method further comprises: notifying the predetermined application that the terminal is currently in an unlocked mode when the terminal is in the locked mode.

In some embodiments, the setting the predetermined application to a non-sleep mode comprises: removing a sleep token of the predetermined application.

In some embodiments, the method further comprises: removing the icon of the predetermined application from the lock screen interface in response to a predetermined user operation when the terminal is in the locked mode.

In some embodiments, the method further comprises: setting the predetermined application to a sleep mode in response to the predetermined user operation when the terminal is in the locked mode.

In some embodiments, the method further comprises: placing the root node of the predetermined application below a root node of a desktop interface in response to the predetermined user operation when the terminal is in the locked mode.

In some embodiments, the displaying a target user interface of the predetermined application comprises: displaying the target user interface of the predetermined application on the lock screen interface based on a predetermined display scale.

In some embodiments, the disclosure provides an apparatus for presenting information on a lock screen interface, comprising: a layout unit, configured to display an icon of a predetermined application at a predetermined position on the lock screen interface when a terminal is in a locked mode; and a display unit, configured to display a target user interface of the predetermined application in response to a user operation on the icon of the predetermined application.

In some embodiments, the disclosure further provides a terminal comprising: at least one processor; and at least one memory communicatively coupled to the at least one processor and storing instructions that upon execution by the at least one processor cause the terminal to perform the method for presenting information on a lock screen interface provided by one or more embodiments according to the disclosure.

In some embodiments, the disclosure further provides a non-transitory computer storage medium storing program instructions that upon execution by a computing device, cause the computing device to perform the method for presenting information on a lock screen interface provided by one or more embodiments according to the disclosure.

The above description is only a preferred embodiment of the disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the above disclosed concept. For example, the above-mentioned features and the technical features disclosed in (but not limited to) the disclosure having similar functions are replaced with each other to form a technical solution.

In addition, although the operations are depicted in a specific order, it should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the disclosure. Certain features that are described in the context of separate embodiments may also be implemented in combination in a single embodiment. Conversely, various features that are described in the context of a single embodiment may also be implemented in multiple implementations individually or in any suitable sub-combination.

Although the subject matter has been described in a language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for presenting information on a lock screen interface, comprising:
   displaying an icon of a predetermined application at a predetermined position on the lock screen interface of a terminal device;
   determining whether the terminal device is currently in a locked mode;
   in response to determining that the terminal device is currently in the locked mode, setting the predetermined application to a non-sleep mode by removing a sleep token of the predetermined application to prevent the predetermined application from sleeping in the locked mode, and placing a node of the predetermined application below a root node of the lock screen interface; and
   launching the predetermined application and displaying a target user interface of the predetermined application while the terminal device is in the locked mode in response to a user operation on the icon of the predetermined application without receiving an additional user operation indicative of a lock release order.

2. The method for presenting information on a lock screen interface according to claim 1, further comprising:
   notifying the predetermined application that the terminal device is currently in an unlocked mode in response to determining that the terminal device is not in the locked mode.

3. The method for presenting information on a lock screen interface according to claim 1, further comprising:
   removing the icon of the predetermined application from the lock screen interface in response to a predetermined user operation when the terminal device is in the locked mode.

4. The method for presenting information on a lock screen interface according to claim 3, wherein the removing the icon of the predetermined application from the lock screen interface comprises:
   setting the predetermined application to a sleep mode in response to the predetermined user operation when the terminal device is in the locked mode.

5. The method for presenting information on a lock screen interface according to claim 3, wherein the removing the icon of the predetermined application from the lock screen interface comprises:
   placing the node of the predetermined application below a root node of a desktop interface in response to the predetermined user operation when the terminal device is in the locked mode.

6. The method for presenting information on a lock screen interface according to claim 1, wherein the displaying a target user interface of the predetermined application comprises:
   displaying the target user interface of the predetermined application on the lock screen interface based on a predetermined display scale.

7. A terminal device for presenting information on a lock screen interface, comprising:
   at least one processor; and
   at least one memory communicatively coupled to the at least one processor and storing instructions that upon execution by the at least one processor cause the terminal device to implement operations comprising:
   displaying an icon of a predetermined application at a predetermined position on the lock screen interface of the terminal device;
   determining whether the terminal device is currently in a locked mode;
   in response to determining that the terminal device is currently in the locked mode, setting the predetermined application to a non-sleep mode by removing a sleep token of the predetermined application to prevent the predetermined application from sleeping in the locked mode, and placing a node of the predetermined application below a root node of the lock screen interface; and
   launching the predetermined application and displaying a target user interface of the predetermined application while the terminal device is in the locked mode in response to a user operation on the icon of the predetermined application without receiving an additional user operation indicative of a lock release order.

8. The terminal device according to claim 7, the operations further comprising:
   notifying the predetermined application that the terminal device is currently in an unlocked mode in response to determining that the terminal device is not in the locked mode.

9. The terminal device according to claim 7, the operations further comprising:
   removing the icon of the predetermined application from the lock screen interface in response to a predetermined user operation when the terminal device is in the locked mode.

10. The terminal device according to claim 9, wherein the removing the icon of the predetermined application from the lock screen interface comprises:
    setting the predetermined application to a sleep mode in response to the predetermined user operation when the terminal device is in the locked mode.

11. The terminal device according to claim 9, wherein the removing the icon of the predetermined application from the lock screen interface comprises:
    placing the node of the predetermined application below a root node of a desktop interface in response to the predetermined user operation when the terminal device is in the locked mode.

12. The terminal device according to claim 7, the operations further comprising:
    displaying the target user interface of the predetermined application on the lock screen interface based on a predetermined display scale.

13. A non-transitory computer-readable storage medium, storing program instructions that upon execution by a computing device, cause the computing device to perform operations comprising:
- displaying an icon of a predetermined application at a predetermined position on a lock screen interface of the computing device;
- determining whether the computing device is currently in a locked mode;
- in response to determining that the terminal device is currently in the locked mode, setting the predetermined application to a non-sleep mode by removing a sleep token of the predetermined application to prevent the predetermined application from sleeping in the locked mode, and placing a node of the predetermined application below a root node of the lock screen interface; and
- launching the predetermined application and displaying a target user interface of the predetermined application while the computing device is in the locked mode in response to a user operation on the icon of the predetermined application without receiving an additional user operation indicative of a lock release order.

14. The non-transitory computer-readable storage medium according to claim 13, the operations further comprising:
- notifying the predetermined application that the computing device is currently in an unlocked mode in response to determining that the computing device is not in the locked mode.

15. The non-transitory computer-readable storage medium according to claim 13, the operations further comprising:
- removing the icon of the predetermined application from the lock screen interface in response to a predetermined user operation when the computing device is in the locked mode.

16. The non-transitory computer-readable storage medium according to claim 15, wherein the removing the icon of the predetermined application from the lock screen interface comprises:
- setting the predetermined application to a sleep mode in response to the predetermined user operation when the computing device is in the locked mode.

17. The non-transitory computer-readable storage medium according to claim 15, wherein the removing the icon of the predetermined application from the lock screen interface comprises:
- placing the node of the predetermined application below a root node of a desktop interface in response to the predetermined user operation when the computing device is in the locked mode.

18. The non-transitory computer-readable storage medium according to claim 13, the operations further comprising:
- displaying the target user interface of the predetermined application on the lock screen interface based on a predetermined display scale.

* * * * *